United States Patent [19]

Shirasaki

[11] Patent Number: 4,641,926
[45] Date of Patent: Feb. 10, 1987

[54] POLARIZING ELEMENT

[75] Inventor: Masataka Shirasaki, Kawasaki, Japan

[73] Assignee: Fujitsu Limited, Kawasaki, Japan

[21] Appl. No.: 815,279

[22] Filed: Dec. 26, 1985

Related U.S. Application Data

[63] Continuation of Ser. No. 513,613, Jul. 14, 1983, abandoned.

[30] Foreign Application Priority Data

| | | |
|---|---|---|
| Jul. 14, 1982 [JP] | Japan | 57-122641 |
| Aug. 31, 1982 [JP] | Japan | 57-151529 |
| Aug. 31, 1982 [JP] | Japan | 57-151530 |
| Mar. 21, 1983 [JP] | Japan | 58-053593 |
| Apr. 30, 1983 [JP] | Japan | 58-076573 |

[51] Int. Cl.⁴ .................. G02B 27/14; G02B 27/28
[52] U.S. Cl. ......................... 350/394; 350/173
[58] Field of Search ........ 350/166, 171, 370, 394–395, 350/401, 170, 286, 173; 356/346

[56] References Cited

U.S. PATENT DOCUMENTS

| | | | |
|---|---|---|---|
| 703,929 | 7/1902 | Ives | 350/170 |
| 2,285,515 | 6/1942 | Hurley | 350/171 |
| 2,403,731 | 7/1946 | MacNeille | 350/394 |
| 2,476,014 | 7/1949 | Wright | 350/171 |
| 2,933,994 | 4/1960 | Bauer | 350/395 |
| 3,230,851 | 1/1966 | Reymond | 350/173 |
| 3,449,576 | 6/1969 | Hoffman, Jr. et al. | 350/401 |
| 3,460,883 | 8/1969 | Lipp | 350/401 |
| 3,565,514 | 2/1971 | Bate et al. | 350/286 |
| 3,743,378 | 7/1973 | Bousky | 350/388 |
| 4,215,938 | 8/1980 | Farrand et al. | 356/351 |

FOREIGN PATENT DOCUMENTS

| | | | |
|---|---|---|---|
| 2076994 | 12/1981 | United Kingdom | 350/370 |
| 838628 | 6/1981 | U.S.S.R. | 350/286 |

OTHER PUBLICATIONS

Dobrowolski et al. "Liquid Polarizing Filter Operates Over Wide Range", Laser Focus, 9-1981, pp. 45–48.

*Primary Examiner*—William H. Punter
*Attorney, Agent, or Firm*—Staas & Halsey

[57] ABSTRACT

A polarizing element comprising a transparent flat plate having at least two parallel surfaces, a polarizing separate layer provided on a portion of one parallel surface of the transparent flat plate and an optical reflecting material provided on a portion of the other parallel surface of the transparent flat plate.

4 Claims, 9 Drawing Figures

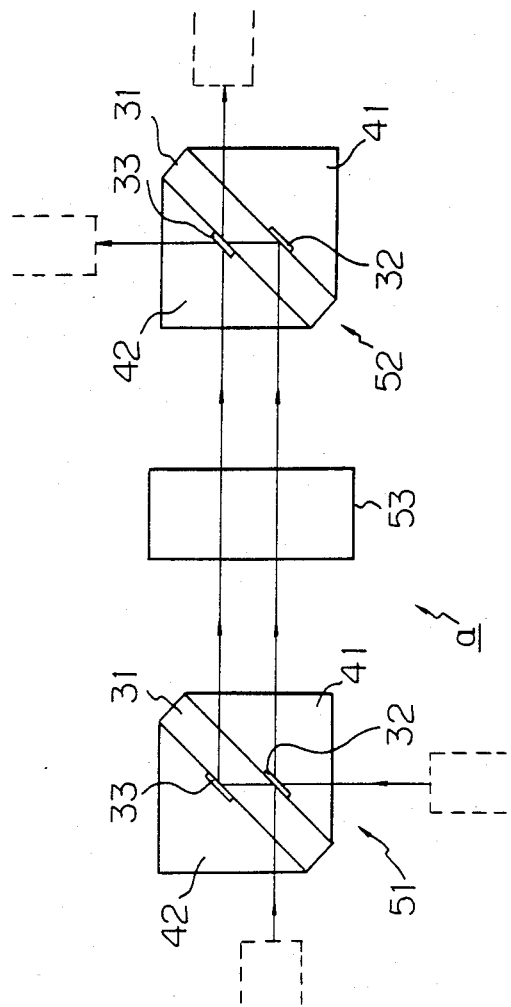

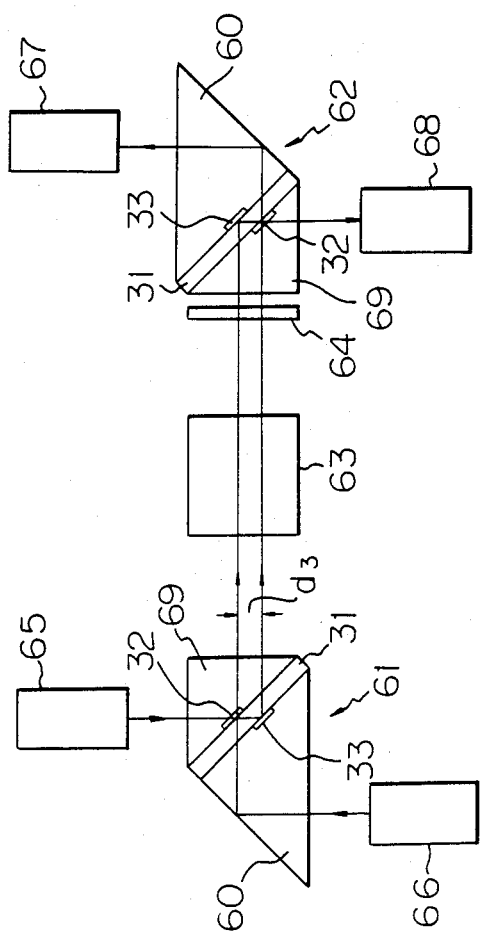

POLARIZING ELEMENT

This is a continuation of co-pending application Ser. No. 513,613 filed on July 14, 1983, and now abandoned.

BACKGROUND OF THE INVENTION

The present invention relates to an optical circuit element. More particularly, the present invention relates to a polarizing element which is used in an optical switch, an optical circulator, etc.

An optical switch comprising a polarizing element and a Faraday rotator is well known. Further, an optical circulator comprising a polarizing element and a Faraday rotator is also well known. The polarizing element used in an optical switch and an optical circulator has a polarizing characteristic in which the distance between polarized light or rays passing through the polarizing element is great, for example, approximately ten millimeters. In the structure of a conventional polarizing element, it is difficult to make the distance less than one millimeter.

SUMMARY OF THE INVENTION

It is an object of the present invention to provide a miniature or compact polarizing element at a low cost.

It is another object of the present invention to provide a polarizing element which can be efficiently used for near infrared rays.

According to the present invention, there is provided a polarizing element comprising a transparent flat plate having at least two parallel surfaces, a polarizing separate layer provided on a portion of one parallel surface of the transparent flat plate, and an optical reflecting material provided on a portion of the other parallel surface of the transparent flat plate.

It is preferred that the transparent flat plate be a glass plate.

It is also preferred that the thickness of the transparent flat plate range from 0.2 to 1.5 mm.

As the polarizing separate layer, a dielectric multilayer is advantageously used. The dielectric multilayer may be made of $TiO_2$ and $SiO_2$.

It is preferred that the reflecting layer be a dielectric multilayer or a metal layer. The dielectric multilayer may be made of $TiO_2$ and $SiO_2$. The metal layer is advantageously made of copper having a thickness of about 3000 Å.

According to the present invention, there is further provided a polarizing element comprising a first right angle prism and a second right angle prism, the polarizing separate layer being disposed between the first right angle prism and the transparent flat plate and the optical reflecting material being disposed between the transparent flat plate and the second right angle prism.

It is preferred that the polarizing separate layer be disposed between a surface of the first right angle prism not forming a right angle and one surface of the transparent flat plate, and that the optical reflecting layer be disposed between a surface of the second right angle prism not forming a right angle and the other surface of the transparent flat plate.

It is preferable that the polarizing separate layer be disposed between a surface of that first right angle prism not forming a right angle and one surface of the transparent flat plate, and that the optical reflecting layer be disposed between a surface of the second right angle prism forming a right angle and the other surface of the transparent plate.

According to the present invention, there is provided a polarizing element further comprising a wave plate, the wave plate being adhered to the first right angle prism by a transparent adhesive having substantially the same refractive index as that of the right angle prism.

BRIEF DESCRIPTION OF THE DRAWINGS

Further advantages of the present invention will be apparent from the following description of the accompanying drawings.

FIG. 5 is a schematic view of an example of an optical switch which makes use of the polarizing element shown in FIG. 4B.

FIG. 6 is a schematic view of another example of an optical switch which makes use of another polarizing element according to the present invention.

DESCRIPTION OF THE PREFERRED EMBODIMENTS

Before describing the preferred embodiments of the present invention, the prior art is further described.

Figure 1:
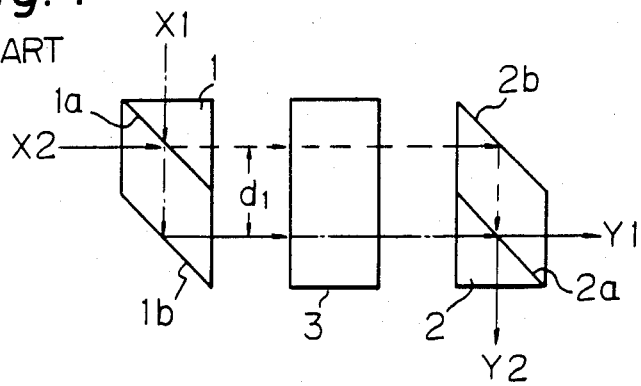
FIG. 1 is a schematic view of an optical switch which makes use of a polarizing element of the prior art.

Referring to FIG. 1, a horizontally polarized ray X1 passes through a polarizing separate film 1a and is reflected by a reflection surface 1b, and the respective reflected horizontally polarized ray is transmitted to a Faraday rotator 3. On the other hand, a vertically polarized ray X2 is transmitted by the polarizing separate film 1a and is transmitted to the Faraday rotator 3.

Conventionally, the distance $d_1$ between the optical paths of horizontally polarized and the vertically polarized rays supplied to the rotator 3 as separated by the polarizing element 1 is approximately ten millimeters.

The distance $d_1$ is based on the geometric size of the polarizing element 1, namely, the distance between the surface of the polarizing separate film 1a and the reflection surface 1b. A similar polarizing element 2 with respective polarizing separate film 2a and reflection surface 2b receiving the rays from the Faraday rotator 3 outputs the transmitted ray Y1 and the reflected ray Y2.

Figure 2:
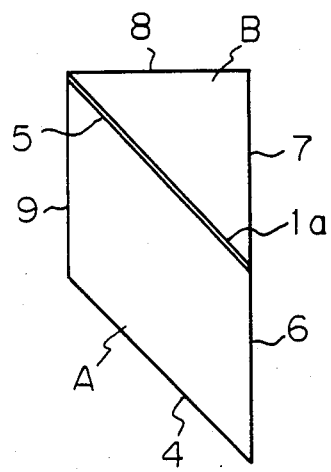
FIG. 2 is a schematic view of the structure of a polarizing element of the prior art.

The structure of a conventional polarizing element 1 is composed of segments A and B as shown in FIG. 2. The segments A and B are separately produced.

The polarizing separate film 1a is provided on part of the segment A and then the segment B is laminated to the segment A since it is necessary that the surfaces 4 and 5 of FIG. 2 be kept precisely parallel and that the plane surfaces 6, 7, 8 and 9 of FIG. 2 be precisely polished in a plane. Further, the segments A and B are assembled so that the surface 6 of the segment A and the surface 7 of the segment B are aligned on the same level.

Thus, it is difficult to both miniaturize the polarizing element while maintaining the precise structure thereof as mentioned above.

Figure 3:
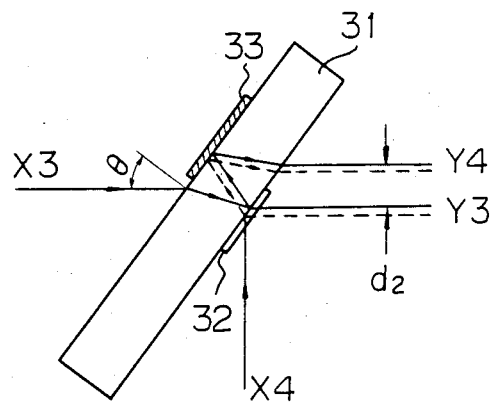
FIG 3 is a schematic view of an example of the polarizing element according to the present invention.

In FIG. 3, which shows a basic polarizing element structure of the present invention, reference numeral 31 denotes a glass plate having a thickness of about 1 mm between parallel planes. On a portion of a surface of the glass plate 31, a polarizing separate layer 32 consisting of a dielectric multilayer of, for example, $TiO_2$ and $SiO_2$ is formed.

On a portion of the opposite surface of the glass plate 31, a reflecting layer 33 consisting of a metal layer of, for example, copper or a dielectric multilayer of, for example, $TiO_2$ and $SiO_2$ is formed. Particularly, is copper is used as the reflecting layer, the polarizing element can be used in a wavelength ranging from 1.3 μm to 1.55 μm. The polarizing separate layer 32 and the reflecting mirror 33 can be formed by ordinary vacuum evaporation or sputtering and a photoetching process.

In the obtained polarizing element, incident light from the direction $X_3$ is separated and passed therethrough in the direction $Y_3$ with respect to horizontal polarization and in the direction $Y_4$ with respect to vertical polarization in accordance with the illustrated line.

On the other hand, incident light from the direction $X_4$ is separated and passed through the polarizing element in the direction $Y_4$ with respect to the horizontal polarization ray and in the direction $Y_3$ with respect to the vertical polarization ray. In this case, the distance $d_2$ between the incident light $Y_3$ and $Y_4$ is calculated from the following equation:

$$d_2 = 2t \cdot \cos\theta \cdot \sin\theta / (n^2 - \sin^2\theta)^{\frac{1}{2}}$$

in which $\theta$ is an incident light angle formed by light $X_3$ transmitted to the polarizating element, t is the thickness of the glass plate 31, and n is the refractive index thereof. When the values of the t, $\theta$, and n are 1 mm, 45°, and 1.5, respectively, the value of $d_2$ calculated from the above equation is approximately equal to 1.26 mm.

According to the present invention, if the parallelism of both surfaces of the glass plate 31 is maintained, a polarizing element using a glass plate 31 having a small thickness can be used so that the distance $d_2$ can be decreased in accordance with the thinness of the glass plate.

Figure 4A:
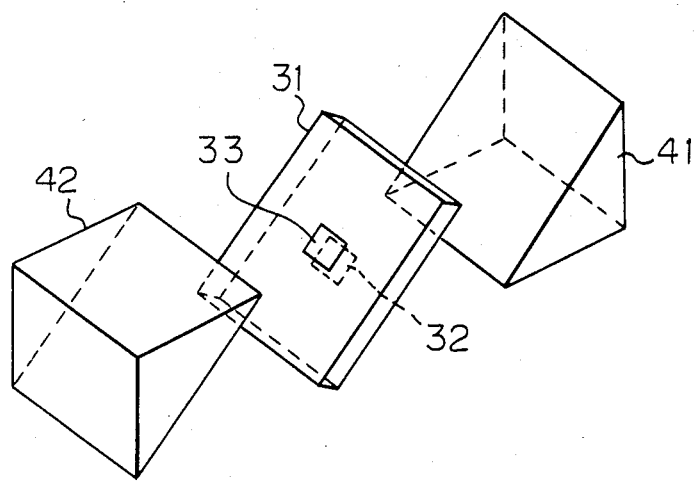
FIGS. 4A and 4B are schematic views of an example of a polarizing element according to the present invention.
Figure 4B:
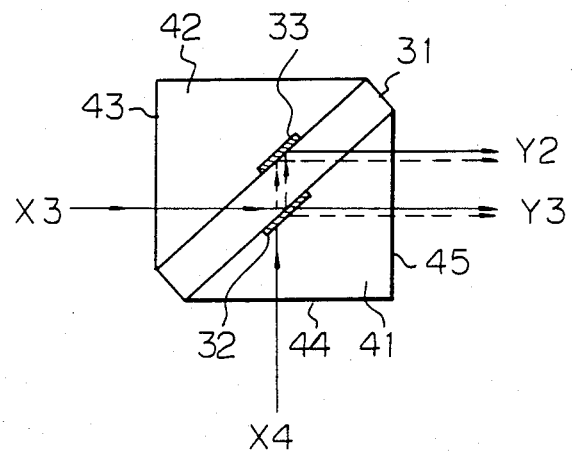

FIGS. 4A and 4B show an example of a polarizing element, wherein a glass plate 31 provided with the polarizing separate layer 32 and the reflecting layer 33 shown in FIG. 3 is assembled with right angle prisms 41 and 42 having the same refractive index as that of the glass plate 31, so that the glass plate 31 is disposed between the right angle prisms 41 and 42. FIG. 4A particularly is a perspective view of the right angle prisms and glass plate before the assembly thereof, and FIG. 4B is a view thereof after the assembly. Since the light from the directions $X_3$ and $X_4$ is transmitted through the respective surfaces 43 and 44 of a polarizing element substantially perpendicularly as shown in FIG. 4B, reflection loss on the incident surface 43 or 44 is reduced so that the incident light angle and the reflection angle are increased at the interface between the polarizing separate layer 32 and the glass plate 31. Thus, the separation property of the polarization can be improved.

The polarizing element shown in FIG. 4B is used as an optical switch a as shown in FIG. 5. The optical switch is composed of polarizing elements 51 and 52 and a Faraday rotator of, for example, yttrium-iron-garnet (YIG). The same reference numerals in FIG. 5 as those in FIGS. 4A and 4B denote the same elements. The optical systems are indicated by the broken lines.

In FIG. 6, another type of optical switch is shown. The optical switch in FIG. 6 is composed of other examples of polarizing elements 61 and 62, a Faraday rotator 63 of, for example, YIG, and a wave plate 64. Reference numerals 65 and 66 are input optical systems, and reference numerals 67 and 68 are output optical systems. The polarizing elements 61 and 62 consist of a glass plate 31, a polarizing separate layer 32, a reflecting layer 33 and right angle prisms 60 and 69. The polarizing separate layer 32 is disposed between a surface of the glass plate 31 and a slanting surface not forming a right angle in a right angle prism 69, and the reflecting layer 33 is disposed between a surface of the glass plate 31 and a surface forming a right angle in a right angle prism 60. The structure of an optical switch as shown in FIG. 6 can be advantageously used so that the optical system can be arranged in a direction parallel to the input rays and the output rays. Therefore, the structure of the optical switch can make the optical switch compact. The wave plate 64 is advantageously provided to adjust the polarizing angle of an output ray to obtain the angle of 90°, when the polarizing angle is not 90° as between the polarizing surface before passing through the Faraday rotator and the polarizing surface after passing through the Faraday rotator.

Figure 7:
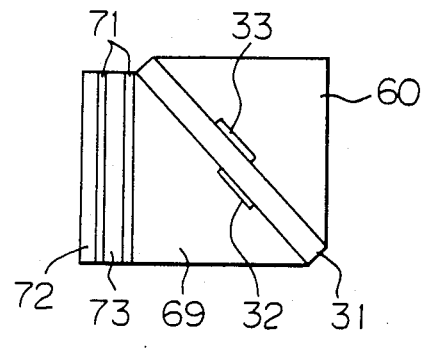
FIGS. 7 and 8 are schematic views of other examples of polarizing elements according to the present invention.

It is preferred that a wave plate 73 (FIG. 7) be adhered to the right angle prism 69 with a bonding medium 71. Further, in order to prevent the surface of the wave plate from undergoing mechanical shock, etc, a glass plate 72 may be adhered to the wave plate 73 as shown in FIG. 7. Such a structure can make a polarizing element having a wave plate compact.

Figure 8:
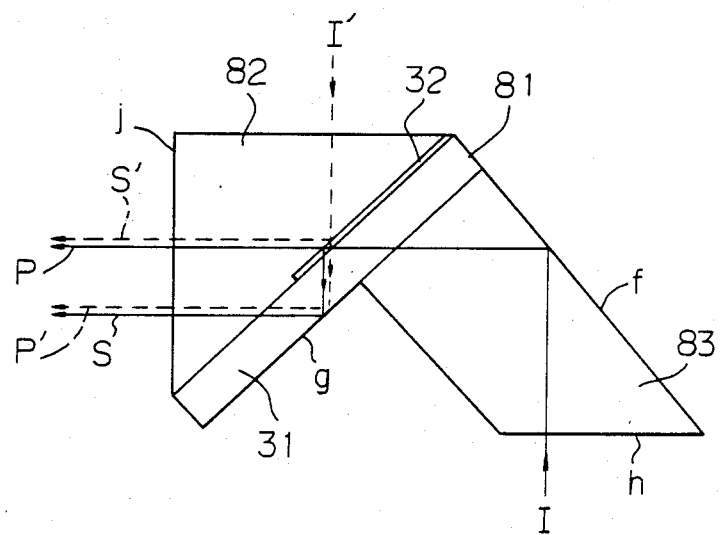

Referring to FIG. 8, on one side surface of the glass plate 31 having parallel surfaces, a polarizing separate layer 32 is provided in such a manner that the polarizing separate layer is disposed between a right angle prism 82 and the glass plate 31. However, on the opposite side surface of the glass plate 31, a reflecting layer is not provided. In place of a reflecting layer, only a prism 83 is provided on the surface of the glass so that a plane surface f of the prism 83 is parallel to a plane surface 81 of the glass plate 31. In the polarizing element shown in FIG. 8, the ray I transmitted vertically through surface h of the prism 83 is reflected on the surface f. Then the reflected ray I passes through the glass plate 31 to the polarizing separate layer 32. A horizontal polarization ray P passes through the polarizing separate layer 32. On the other hand, a vertical polarization ray S is reflected on the polarizing separate layer 32 and is passed through the glass plate 31. Then the vertical polarization ray S is reflected on a surface g of the glass plate 31, which surface forms a boundary between the air and the glass. Thusly the ray I is separated into a horizontal polarization P and a vertical polarization S. The I' is also separated into a horizontal polarization P' and a vertical polarization S'. The polarizing element shown in FIG. 8 is also used in an optical switch.

I claim:

1. A polarizing element comprising a first right angle prism, a second right angle prism, and a transparent flat plate having at least two parallel surfaces, a polarization separating layer provided on a portion of a first one of said two parallel surfaces of the transparent flat plate, and an optical reflecting layer provided on a portion of the second parallel surface of the transparent flat plate, said transparent flat plate being interposed between the first right angle prism and the second right angle prism, wherein each of said first and second right angle prisms has two right-angle-forming surfaces which intersect to form the respective right angle and a diagonal surface, wherein a light beam incident on a respective one of said surfaces of each of said first and second right angle prisms is separated into two respectively polarized light beams by said polarization separating layer, one of said polarized light beams is reflected by said optical reflecting layer, and two respective output light beams are output through a predetermined other one of said surfaces of a predetermined one of said first and second right-angle prisms.

2. The polarizing element of claim 1, wherein said incident light beam and said two respective output light beams are substantially perpendicular to the respective surface of each respective one of said right angle prisms upon which it is incident and from which it is output, respectively.

3. An optical switch, comprising:

two of said polarizing elements of claim 2, arranged so that two light beams corresponding to said two respective output light beams output from said predetermined surface of said predetermined right angle prism of a first one of said polarizing elements are provided as respective input light beams to a predetermined respective surface of a predetermined one of said right angle prisms of the second polarizing element, and a Faraday rotator located between said two polarizing elements to receive as an input said two respective output beams output from said first polarizing element and to output said two light beams corresponding thereto as said respective input light beams to said second polarizing element.

4. The optical switch of claim 3, comprising a wave plate combined in series with said Faraday rotator, the combination thereof receiving as inputs said two output light beams from said first polarizing element, and providing as outputs from the combination said two corresponding light beams as said respective input light beams to said second polarizing element.

* * * * *